United States Patent Office 3,294,110
Patented Dec. 27, 1966

3,294,110
LIQUID LEVEL CONTROL
Kazimir Stanislaus Rauszer, Glasgow, Scotland, assignor to The Hoover Company, North Canton, Ohio, a corporation of Ohio
Filed Mar. 5, 1964, Ser. No. 349,554
Claims priority, application Great Britain, Mar. 15, 1963, 10,466/63
11 Claims. (Cl. 137—386)

The present invention relates to certain new and useful improvements in a liquid level control of which the following is a full, clear and concise description:

An object of this invention is to construct a liquid level control for controlling the level of liquid in a receptacle.

Another object of this invention is to construct such a control which will not be subject to premature actuation due to surges of the liquid in the receptacle.

Another object of this invention is to construct such a control which will not be subject to premature actuation or clogging from foam or detergents.

Other objects and advantages will become apparent as the detailed description proceeds.

For a clear understanding of the present invention reference is made to the accompanying drawing wherein.

Figure 1:
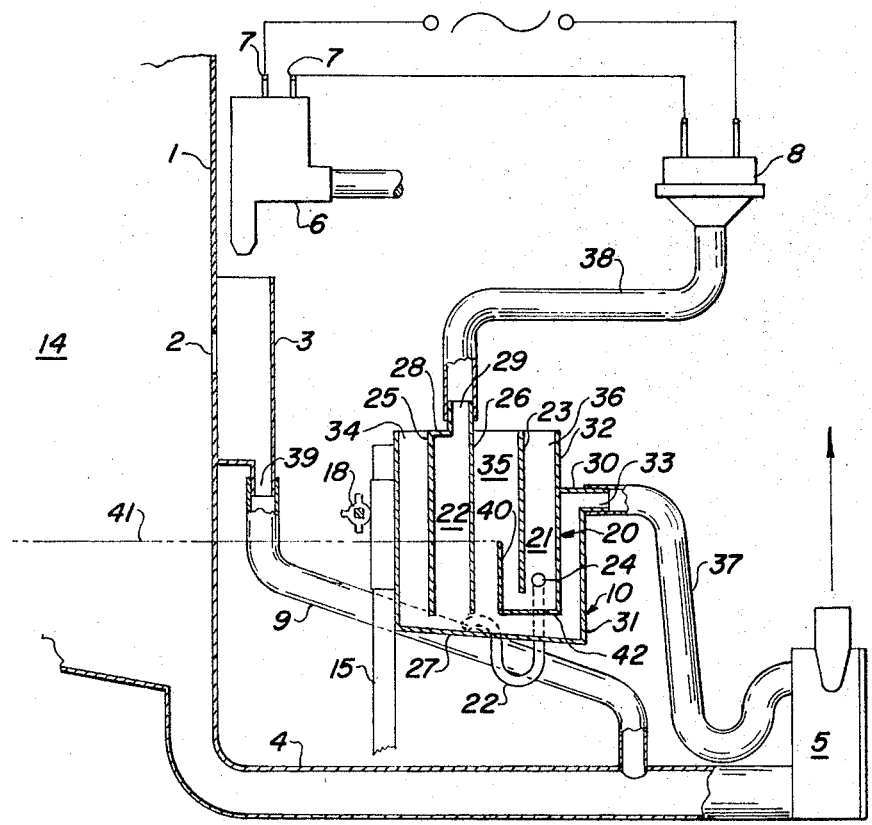
FIG. 1 is a front view of a washing machine or the like taken directly behind the front cabinet panel with the device of the present invention illustrated on an enlarged scale and with certain portions thereof cut away for a better understanding.

Referring now to FIGURE 1, wall 1 of a receptacle has an opening 2 formed therein. An open topped chamber 3 is secured to the side wall 1 of the receptacle over the opening 2. A drain conduit 4 extends from the bottom of the receptacle to a pump 5.

Liquid supply means 6 is located above the open top of chamber 3. Liquid supply means 6 is provided with an electrically operated valve and leads 7 connect the electrically operated valve to an electric pressure sensitive switch 8.

Pipe 9 extends from the bottom of chamber 3 to drain conduit 4.

Container 10 is mounted for vertical movement on channel 15 in a manner which will later be described in detail.

Container 10 could take many shapes but is preferably square or rectangular in plan view, and has four sides and a bottom.

Member 20 comprises two spaced apart vertical portions joined at their bottoms by a horizontal portion. Member 20 extends completely across container 10 and is secured to opposite side walls thereof in any suitable manner as by welding. The vertical and horizontal portions of member 20 form an upwardly opening channel which defines a first chamber 21 within container 10. That portion of container 10 which is outside of chamber 21 constitutes a second chamber.

Flexible tube 22 extends through a side wall of container 10 and connects chamber 21 with pipe 9.

Plate 23 extends completely across container 10 and is secured to opposite side walls thereof. The lower portion of plate 23 extends into chamber 21. The bottom end of plate 23 is spaced above the horizontal portion of member 20 and slightly below orifice 24.

Plates 25 and 26 extend completely across container 10 and are secured to opposite side walls thereof. The lower ends of plates 25 and 26 are spaced above the bottom 27 of container 10. A plate 28 closes the top of plates 25 and 26 thereby forming a space 22. Orifice 29 communicates with space 22 through plate 28.

Plate 30 extends completely across container 10 and is secured to opposite side walls thereof, and to the top of wall 31 and a vertical portion 32 of member 20. Orifice 33 communicates with the interior of the container.

The top of container 10 is open to the atmosphere at 34, 35 and 36.

Pipe 37 connects orifice 33 to pump 5. Pipe 38 connects orifice 29 to switch 8.

Pipes 9, 22, 37 and 38 are preferably all made of flexible material such as rubber or synthetic plastic.

Orifice 39 in the bottom of chamber 3 is restricted so that the water in chamber 3 does not cause a positive pressure head in pipe 9. Tube 22 is connected to the top of pipe 9 so that water flowing through pipe 9 will not enter tube 22.

Preferably, means is provided for changing the relative vertical position of the overflow edge of portion 40 on member 20 so that switch 8 will be actuated at different levels of liquid in receptacle 14.

Figure 2:
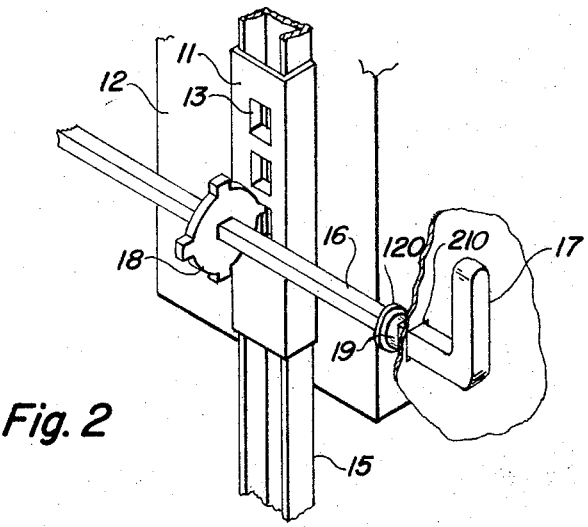
FIG. 2 is a perspective view of a mechanism for changing the vertical position of the device of the present invention.

Such a means could take many forms and one mechanism for performing the function is shown in FIG. 2.

Channel 11 has the ends of its flanges secured, as by welding, to side wall 12 of container 10. The web of channel 11 is toothed as at 13.

Secured to the supporting framework or cabinet for receptacle 14 is another channel 15. Channel 15 is vertically positioned and is positioned in the opening formed by channel 11 with side wall 12. Container 10 is free to move vertically on channel 15.

Rod 16 is mounted in a horizontal position to the supporting framework or cabinet for receptacle 14. Rod 16 is square in cross-sectional shape and is rounded at one end for rotation in its mounting, and formed with a lever 17 at its other end. A gear 18 is mounted on rod 16 with its teeth in engagement with the teeth 13 of channel 11. Rod 16 is free to slide axially with respect to gear 18. Rod 16 is formed with a rounded portion as at 19 and a stop as at 120. The mounting 210 on the supporting framework or cabinet for the lever end of rod 16 is of substantially the same cross-sectional shape as the rod.

In operation lever 17 is pulled until stop 120 strikes the supporting framework or cabinet. Rounded portion 19 is then in mounting 210 and rod 16 is free to rotate. Rotation of the rod 16 and gear 18 will move container 10 up or down. Container 10 is held in position by pushing on lever 17 to engage the square portion of rod 16 in the square mounting 210.

In operation, container 10 is moved on channel 15 until the top edge of vertical member 40 is positioned at the desired liquid level 41 in receptacle 14. Liquid supply means 6 is then turned on filling chamber 3 until liquid overflows through orifice 2 into receptacle 14. Restricted orifice 39 allows only a limited amount of liquid to flow through pipe 9 and into conduit 4 thereby keeping any foam or detergent from entering pipe 9 and tube 22. As liquid rises in receptacle 14 pipe 9 will fill with liquid from conduit 4. As the liquid continues to rise it will flow from pipe 9 through tube 22 and orifice 24 into chamber 21. The positioning of the bottom edge of plate 23 is effective as a foam separator for any foam or detergent which may enter chamber 21 through orifice 24. When the liquid in receptacle 14 has reached the desired level the liquid in chamber 21 overflows the top edge of vertical portion 40 of member 20 and begins to fill the second chamber portion of container 10. Water then begins to rise in the second chamber portion of container 10 and into space 22 thereby causing a positive pressure to act through pipe 38 and actuate switch 8 which in turn actuates the control valve in liquid supply means 6.

When the system is drained water flows from chamber 21 through tube 22 into pipe 9 and into pump 5. While pump 5 is pumping liquid a vacuum is formed in pipe 37 which sucks water out of the second chamber portion of container 10 down to a level at the bottom edges of plates 25 and 26. At that point the vacuum is broken by air entering through top openings 34, 35 and 36.

The second chamber of container 10 could be drained in other ways as by connecting pipe 37 to a venturi in drain conduit 4 rather than to the pump.

The bottom edges of plates 25 and 26 preferably lie in the same plane as horizontal portion 42 of member 20.

Plates 25 and 26 could be replaced by a single pipe mounted on container 10 by any suitable brace. The pipe could also be curved so as to project through a sidewall of container 10.

The cut-off point for the liquid supply means can be changed merely by shifting the container 10 vertically and changing the vertical position of the top edge of vertical portion 40 of member 20.

The level control of the present invention is especially well adapted for use with clothes or dish washing machines although it would perform just as effectively in other apparatus where detergents were not employed.

Since the control is especially well adapted for use with clothes or dish washing machines where detergent is used it is to be emphasized that the present invention substantially prevents detergent or suds from entering the level control. Only clean water from supply means 6 flows through pipe 9, and when the water finally enters tube 22 and chamber 21 it is the clean water flowing through pipe 9 and not dirty water from receptacle 14.

The repeated presence of detergent and suds in the level control could cause a buildup of a deposit which would clog the system. Also, the vapor entrained in suds could interfere with accurate operation of switch 8.

Of course, in apparatus where detergent is not employed pipe 9 could be eliminated and tube 22 connected directly to receptacle 14. Also, if less accuracy of the control were satisfactory and eventual clogging of the system were not objectionable, tube 9 could be eliminated even in apparatus where detergents are used and tube 22 connected directly to receptacle 14.

Switch 8 is preferably well above container 10 so that only air pressure acting through pipe 38 actuates the switch. The switch could be located below container 10 so that switch 8 would be actuated by a certain head of water in the pipe leading to it. For safety and economy the air pressure actuated switch is far more desirable than one which must be well sealed and insulated from water. Water in contact with the switch would also tend to rust certain moving parts of the switch and the accuracy of the system would be seriously damaged. Also, any detergent or suds which reached the switch would eventually clog the moving parts.

Switch 8 is preferably of the type wherein a diaphragm divides the switch into a pressure chamber and a switch chamber. Means extend between the diaphragm and the switch contacts to close the contacts when a positive pressure acts on the diaphragm through the pressure chamber. One example of this type of switch is shown in U.S. Patent 3,064,094, issued November 13, 1962, to Marchi. The specific structure of the general type of switch used in the present invention is not critical and many other switches could be used besides the specific one shown by the above patent.

In prior art devices using a pressure actuated switch pipe 38 in FIG. 1 is connected directly to receptacle 14 and water entering receptacle 14 also rises in pipe 38 to continuously build up pressure until the switch is actuated. In these prior art arrangements any surge of water in receptacle 14 due to bumping of the receptacle or dropping objects therein also causes a surge in the pipe leading directly from the receptacle to the switch. Such a surge of water actuates the switch prematurely and the water level in the receptacle is well below what the operator desired.

Where the switch is of the type which requires a constant pressure above a certain value to hold the contacts closed repeated surges or waves in the receptacle could cause chattering or repeated opening and closing of the switch contacts which would soon do serious damage.

The switches in the prior art arrangements also have to be very accurately calibrated to operate at a specific pressure. The level of the water in the pipe leading directly from the receptacle to the switch is the same as the water level in the receptacle. Actuation of the switch when the water level in the pipe is a few inches above or below the level at which the switch is supposed to operate also means that the level in the receptacle is a few inches too high or too low. In a receptacle having a large cross-sectional area a few inches too much or too little water would mean that the receptacle would have gallons too much or too little water. If the difference between the desired amount of water and the actual amount were only a pint or less it might not be critical. Where the difference is a matter of gallons it would result in a waste of water or ineffective washing of the articles in the receptacle.

The prior art devices also require an expensive and complicated mechanism to permit resetting of the switch to operate at different pressures and obtain different liquid levels in the receptacle.

In the present invention the switch 8 need not be accurately calibrated and premature actuation of the switch or chattering of the contacts is eliminated.

Water does not overflow to the top edge of vertical portion 40 of member 20 until the water in the receptacle is at the desired level. Since the surface area of the second chamber portion of container 10 is very small with respect to the surface area of receptacle 14, a very minute rise of water in the receptacle above level 41 causes a large amount of water to overflow vertical portion 40 and container 10 is filled very rapidly. For example, if the surface area of the water in receptacle 14 is ten times as great as the surface area of the second chamber portion of container 10, a rise of only one-tenth of an inch above level 41 in the receptacle would cause a full one inch rise of water in the second chamber portion of container 10.

In the present invention switch 8 could be calibrated to operate, for example, at a two inch water level in space 22 of container 10. Inaccuracy of calibration of the switch which caused it to operate at one or three inches of water in space 22 would only mean a tenth of an inch or less of inaccuracy in the receptacle water level.

Plate 23, which extends down into chamber 21 acts as a foam separator to keep any foam out of space 22. If tube 22 were connected directly to the receptacle of a washing machine plate 23 would keep most of the detergent and suds in chamber 21 and prevent them from being washed into the second chamber portion.

Plate 23 also acts as a dampener for any surges which might occur in chamber 21. Surges in receptacle 14 when level 41 is nearly reached would not cause an equal surge in chamber 21 because plate 23 would serve as a dampener and the arrangement of the system would further dampen transmission of a full surge from receptacle 14 to chamber 21. Occasionally some water might overflow chamber 21 prematurely but this would not ordinarily be enough to actuate switch 8.

The present invention also eliminates the necessity for a complicated and expensive mechanism in switch 8 for varying the pressure at which the switch will operate to vary the liquid level in the receptacle.

It is readily apparent that these features of the present invention are very advantageous and represent a substantial improvement over prior art devices.

The means of FIGURE 2 for moving container 10 vertically to establish different liquid levels in receptacle 14 could take many other forms. Any mechanism which varied the vertical position of the top edge of vertical portion 40 would be sufficient.

Container 10 is actually very small and the drawing is not to scale. Container 10 would usually be mounted to channel 15 on the supporting cabinet in the space normally found between receptacle 14 and the supporting cabinet.

As is readily apparent, the present invention could readily be incorporated into existing devices wherein a pipe runs directly from the receptacle to the switch. All that would be necessary would be to cut the pipe and connect one end to orifice 24 of container 10, and the other end to orifice 29 of container 10.

From the foregoing it can be seen that the present invention provides a simple device for accurately regulating the liquid level in a receptacle. It will be apparent to those skilled in the art that the present invention and its advantageous features represent a substantial improvement over prior art devices.

While only a single embodiment of the present invention has been shown and described it is to be understood that the embodiment shown and described is only illustrative, and is not to be taken in a limiting sense. The present invention includes all equivalent variations of the embodiment disclosed and described, and is limited only by the scope of the claims.

I claim:

1. A liquid level control for a receptacle having an inlet valve and automatic regulating means for opening and closing said valve comprising; a first tube having one end communicating with the interior of said receptacle near the bottom thereof and having its other end communicating with an overflow chamber, the overflow level of said overflow chamber being substantially the same as the desired liquid level in said receptacle, a second tube having one end communicating with the overflow of said overflow chamber and having its other end comunicating with a pressure actuated switch, said pressure switch being above the overflow level of said overflow chamber and coupled to said automatic regulating means, whereby when the liquid in said receptacle reaches the desired level the liquid overflows from said overflow chamber into said second tube thereby compressing the air in said second tube which causes actuation of said pressure switch to close said inlet valve through said automatic regulating means.

2. The liquid level control of claim 1 wherein said first tube communicates with said overflow chamber through an orifice, the bottom of said orifice being spaced a small distance above the bottom of said overflow chamber, a baffle projecting into said overflow chamber between said orifice and the overflow edge of said overflow chamber, said baffle extending completely across said overflow chamber, the bottom edge of said baffle being spaced a small distance above the bottom of said overflow chamber and slightly below the bottom of said orifice.

3. The liquid level control of claim 1 including means for varying the relative vertical position of the overflow level of said overflow chamber to establish different liquid levels in said receptacle.

4. In a clothes washing machine or the like, a receptacle, said receptacle having a liquid inlet opening, a filling chamber adjacent said inlet opening, the bottom of said filling chamber being positioned below said inlet opening, liquid supply means for said filling chamber, said filling chamber being adapted to receive liquid from said liquid supply means and deliver the liquid to said receptacle through said inlet opening, an automatic valve in said liquid supply means, a drain conduit connected to the bottom of said receptacle, a first pipe connected between the bottom of said filling chamber and said drain conduit, an overflow chamber connected to said first pipe, said overflow chamber having an overflow edge positioned at substantially the same level as the desired liquid level in said receptacle, means preventing water flowing through said first pipe from entering said overflow chamber until the liquid level in said receptacle is at substantially the same level as the connection from said first pipe to said overflow chamber, a second tube having one end communicating with the overflow from said overflow chamber and having its other end communicating with a pressure actuated electrical switch, said switch being coupled to said automatic valve in said liquid supply means, whereby when the liquid in said receptacle reaches the desired level the liquid overflows from said overflow chamber and enters said second tube thereby actuating said pressure switch to close said automatic valve.

5. In a washing machine or the like, a receptacle, liquid supply means for supplying liquid to said receptacle, said liquid supply means having an automatic valve therein, an overflow chamber communicating with said receptacle, said overflow chamber having an overflow edge positioned at substantially the same level as the desired liquid level in said receptacle, a pressure actuatable switch communicating with the overflow from said overflow chamber and being coupled to said automatic valve, whereby when the liquid in said receptacle reaches the desired level the liquid overflows from said overflow chamber and actuates said pressure switch which in turn closes said automatic valve.

6. The washing machine or the like of claim 5 including means for varying the relative vertical position of the overflow edge of said overflow chamber to establish different liquid levels in said receptacle at which said pressure switch will be actuated to close said automatic valve.

7. The washing machine or the like of claim 5 wherein said overflow chamber communicates with said receptacle at a point substantially below the lowest liquid level desired in said receptacle.

8. The washing machine or the like of claim 5 including foam separator means positioned in said overflow chamber between said overflow edge and the connection from said receptacle to said overflow chamber.

9. The washing machine or the like of claim 8 wherein said foam separator means comprises a baffle plate extending completely across said overflow chamber, the bottom edge of said baffle plate being positioned a small distance above the bottom of said overflow chamber and slightly below the bottom of the connection from said receptacle to said overflow chamber.

10. The washing machine or the like of claim 9 including means for varying the relative vertical position of the overflow edge of said overflow chamber to establish different liquid levels in said receptacle at which said pressure switch will be actuated to close said automatic valve.

11. In a receptacle having liquid inlet means and automatic regulating means for starting and stopping the flow of liquid through said inlet means, a liquid level control for said receptacle comprising; an overflow chamber, a first tube having one end communicating with the interior of said receptacle near the bottom thereof and having its other end communicating with said overflow chamber, the overflow level of said overflow chamber being substantially the same as the desired liquid level in said receptacle, a second tube having one end communicating with the overflow of said overflow chamber and having its other end communicating with a pressure actuated switch, said pressure switch being coupled to said automatic regulating means, whereby when the liquid in said receptacle reaches the desired level the liquid overflows from said overflow chamber into said second tube thereby compressing the air in said second tube which causes actuation of said pressure switch to operate said automatic regulating means and stop the flow of liquid through said inlet.

References Cited by the Examiner
UNITED STATES PATENTS 2,592,314   4/1952   Morton _____ 137—387

WILLIAM F. O'DEA, *Primary Examiner.*

D. R. MATTHEWS, *Assistant Examiner.*